(12) United States Patent
Nakagawa et al.

(10) Patent No.: US 7,562,114 B2
(45) Date of Patent: Jul. 14, 2009

(54) METHOD AND SYSTEM FOR SUPPORTING RESPONDING TO INQUIRY REGARDING DIGITAL CONTENT

(75) Inventors: Jun Nakagawa, Tokyo (JP); Amane Nakajima, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 11/767,808

(22) Filed: Jun. 25, 2007

(65) Prior Publication Data

US 2008/0028022 A1    Jan. 31, 2008

(30) Foreign Application Priority Data

Jul. 25, 2006    (JP)    ............... 2006-202352

(51) Int. Cl.
G06F 15/16    (2006.01)
(52) U.S. Cl. .................. 709/203; 709/217; 709/223; 707/3; 707/10
(58) Field of Classification Search .................. 709/203, 709/217–219, 223; 707/1, 3, 10
See application file for complete search history.

(56) References Cited

U.S. PATENT DOCUMENTS

| | | | | |
|---|---|---|---|---|
| 6,151,624 | A * | 11/2000 | Teare et al. .................. | 709/217 |
| 6,397,219 | B2 * | 5/2002 | Mills .......................... | 707/10 |
| 6,910,029 | B1 * | 6/2005 | Sundaresan ................... | 707/2 |
| 6,910,071 | B2 * | 6/2005 | Quintero et al. ............. | 709/224 |
| 6,959,326 | B1 * | 10/2005 | Day et al. .................... | 709/217 |
| 6,973,450 | B1 * | 12/2005 | Silverbrook et al. .......... | 707/3 |
| 6,973,455 | B1 * | 12/2005 | Vahalia et al. ................ | 707/8 |
| 7,428,582 | B2 * | 9/2008 | Bean et al. .................... | 709/218 |
| 2002/0065675 | A1 * | 5/2002 | Grainger et al. ............... | 705/1 |

FOREIGN PATENT DOCUMENTS

| | | |
|---|---|---|
| JP | PUPA09-205635 | 8/1997 |
| JP | 2003296548 A | 10/2003 |
| JP | PUPA2003-296548 | 10/2003 |
| JP | 2004234225 A | 8/2004 |

* cited by examiner

*Primary Examiner*—Saleh Najjar
*Assistant Examiner*—Faruk Hamza
(74) *Attorney, Agent, or Firm*—Arien L. Oken; Shimokaji & Associates, P.C.

(57) ABSTRACT

A method and system for supporting responding to an inquiry received from a client regarding a digital content published on at least one server respectively corresponding to at least one content record each containing a content identifier identifying the digital content, a network address of a server, and a publishing period at the server for the digital content. Information derived from the inquiry (i.e., at least one network address keyword relating a first server's network address from which the digital content was accessed by the client at an accessed time, and one or more narrowing keywords pertaining to the digital content) is utilized to identify the first server's network address, obtain the content identifier of the digital content, and extract at least one response template from a response database. An inquiry response containing a selected response template is transmitted to the client in response to the received inquiry.

1 Claim, 7 Drawing Sheets

| CONTENT ID | URL | PUBLISHING STARTED | PUBLISHING STOPPED | CONTENT SUMMARY |
|---|---|---|---|---|
| 0001 | http://www.abc.com/index.html | 2006/4/1 9:00 | 2006/4/30 17:00 | TOP PAGE |
| 0002 | http://www.abc.com/printer.html | 2006/5/1 9:00 | | INTRODUCTION TO PRINTER A PRODUCT |
| 0003 | http://www.abc.com/campaign.html | 2006/4/1 9:00 | 2006/6/1 9:00 | SALES CAMPAIGN FOR PERSONAL COMPUTER PRODUCT B |
| 0004 | http://www.abc.com/index.html | 2006/4/30 17:00 | | UPDATE OF TOP PAGE WITH CHANGE OF CORPORATE LOGO |
| 0005 | http://www.abc.com/campaign.html | 2006/6/1 9:00 | | SALES CAMPAIGN FOR PERSONAL COMPUTER PRODUCT C |
| ⋮ | ⋮ | ⋮ | ⋮ | ⋮ |
| 0003 | http://www.xyz_shop.com/abc_product/campaign.html | 2006/5/1 9:00 | 2006/7/1 9:00 | SALES CAMPAIGN FOR PERSONAL COMPUTER PRODUCT B |

| RESPONSE TEMPLATE ID | CONTENT ID OF THE TARGET OF INQUIRY | DATE AND TIME OF INQUIRY | CONTENT OF INQUIRY | CONTENT OF RESPONSE (RESPONSE TEMPLATE) |
|---|---|---|---|---|
| 0001 | 0005 | 2006/6/24 13:00 | DATE AND TIME OF END OF CAMPAIGN | ○○ CAMPAIGN LASTS UNTIL 11:59 PM OF AUGUST 31. |
| 0002 | 0003 | 2006/6/21 10:00 | PRODUCT SPECIFICATION OF THE PERSONAL COMPUTER LISTED ON THE CAMPAIGN | PERSONAL COMPUTER PRODUCT B IS 30.2 cm IN WIDTH, 20.8 cm IN DEPTH, AND 10.0 cm IN HEIGHT. |
| ⋮ | ⋮ | ⋮ | ⋮ | ⋮ |
| 0003 | 0002 | 2006/7/10 15:00 | ANNUAL SUPPORT FEE FOR THE PRINTER PRODUCT | ANNUAL SUPPORT FEE FOR PRINTER A IS 3,000 YEN. |

METHOD AND SYSTEM FOR SUPPORTING RESPONDING TO INQUIRY REGARDING DIGITAL CONTENT

FIELD OF THE INVENTION

The present invention relates generally to an information processing technology, and more particularly to a method and system for supporting responding to inquiries regarding digital content.

BACKGROUND OF THE INVENTION

With the recent spread of the Internet, it has become common practice for enterprises and individuals to publish digital contents on web sites to widely provide information. For example, an enterprise manufacturing and selling computers provides consumers with the information regarding its computer products (specification of the products, sales campaign, recall notification and the like) on its own web site or on a web site of the sales agency.

The consumer who has accessed the digital content published on a web site may have further questions. In order to answer such questions, the enterprise running the web site may establish a contact center. In the contact center, it is often configured such that each operator responds to an inquiry received via an electronic mail or telephone.

SUMMARY OF THE INVENTION

The present invention provides a method for supporting responding to an inquiry received from a client regarding a digital content published on at least one server on a network that couples an enterprise system to the least one server, said method comprising:

recording, in an update history database of the enterprise system, at least one content record such that each content record of the at least one content record respectively corresponds to a corresponding server of the at least one server, wherein each content record comprises a content identifier (ID) that identifies the digital content in the content record, a network address of the server corresponding to the content record, and a publishing period during which the digital content has been published at the server corresponding to the content record;

receiving information derived from the inquiry, wherein the information derived from the inquiry comprises at least one network address keyword relating to a network address of a first server from which the digital content was accessed by the client, an accessed time at which the digital content was accessed by the client from the first server, and one or more narrowing keywords pertaining to the digital content, and wherein the at least one server comprises the first server;

identifying the network address of the first server, utilizing the at least one network address keyword;

obtaining the content ID of the digital content from a first content record, utilizing the network address of the first server and a publishing period encompassing the accessed time in the first content record, wherein the at least one content record comprises the first content record;

ascertaining whether at least one response template associated with the content ID in the first content record exists in a response database of the enterprise system, utilizing at least one narrowing keyword of the one or more narrowing keywords;

if said ascertaining ascertains that the at least one response template associated with the content ID in the first content record exists in the response database, then extracting the at least one response template from the response database followed by generating an inquiry response that comprising a selected response template of the extracted at least one response template, otherwise generating the inquiry response such that the inquiry response does not comprise any response template in the response database; and transmitting the inquiry response to the client in response to the received inquiry, wherein the method is performed by program code executing on at least one processor of the enterprise system.

BRIEF DESCRIPTION OF THE DRAWINGS

FIG. 5 is an example of contents of an update history database in the embodiment of the present invention.

FIG. 6 is an example of contents of a response database in the embodiment of the present invention.

DETAILED DESCRIPTION OF THE INVENTION

Figure 1:
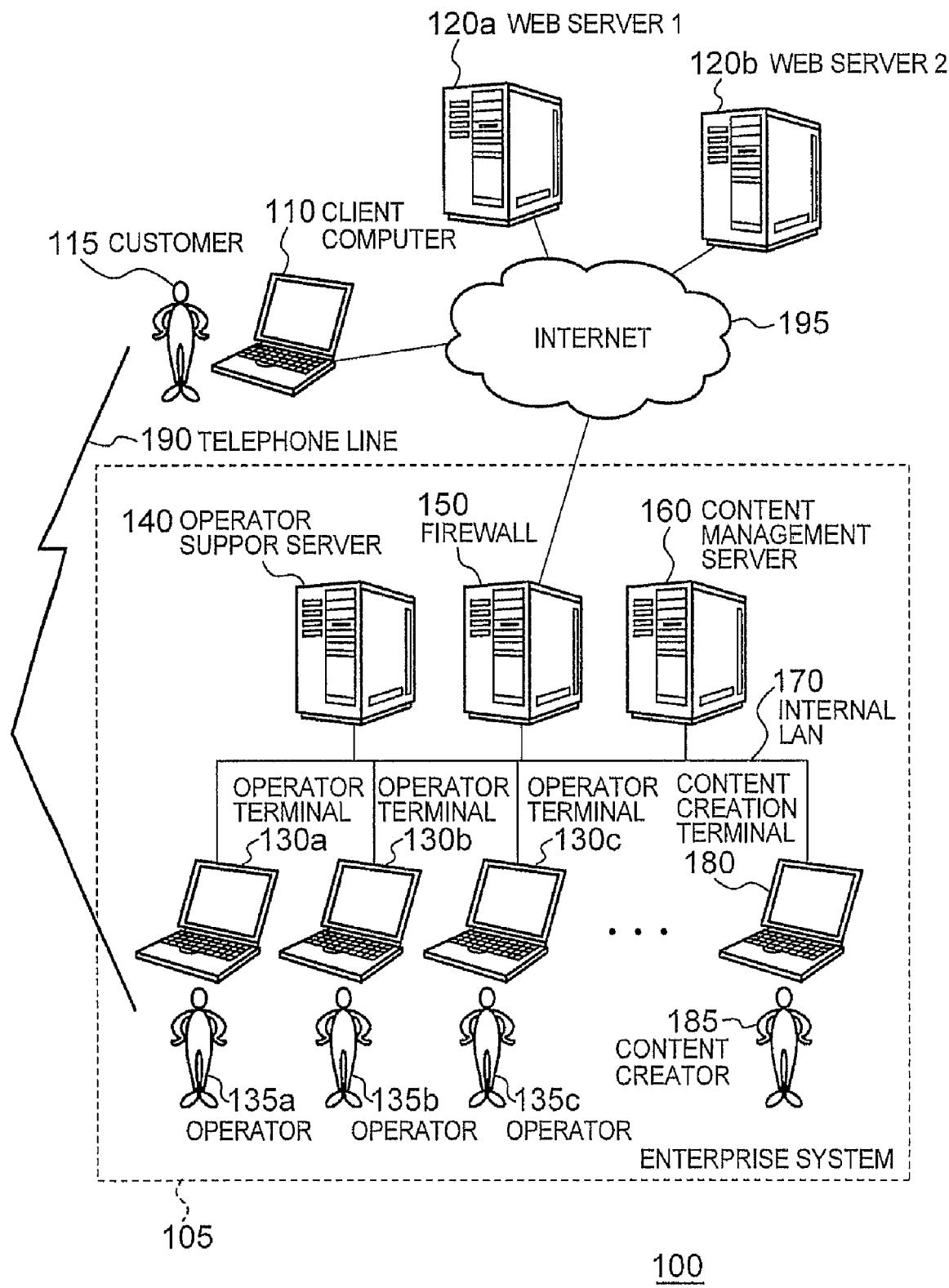
FIG. 1 is a high-level conceptual diagram of a system according to an embodiment of the present invention.

Hereinafter, the best mode for carrying out the present invention will be described in detail with reference to the drawings. The following embodiment, however, does not restrict the claimed invention, and all the combinations of the features discussed in the embodiment are not necessarily indispensable for the solving means of the invention.

Enterprises and individuals may publish the same web contents on a plurality of web sites. For example, they may publish the information regarding their own products on their web sites as well as on the web sites of the sales agencies. In such a case, a response to the inquiry from a client who accessed the content on a web site may be reusable as the response to the inquiry from a client who accessed the same content on a different web site. It however is difficult for an operator to reuse the past response to the inquiry regarding the same content published on a web site that is different from the web site accessed by the client who has made the current inquiry, since there is no means for automatically finding such past response.

In particular, in the case of a frequently upgraded content, it is often difficult to determine which version of the content the client is now inquiring about, since the publishing period of the content may differ for every web site. As such, it is difficult for the operator to select an appropriate response template, resulting in a long time required for providing an accurate response. The conventional arts would not be able to solve such a problem.

In view of the foregoing, the present invention provides a method, program and system for allowing an operator to reuse a past response more efficiently when responding to an inquiry regarding a digital content published on a plurality of servers on a network.

Thus, the present invention provides a system for supporting responding to an inquiry from a client regarding a digital content published on a plurality of servers on a network. The system includes: means for making an inquiry into a database that records a network address and a publishing period of the digital content at each of the plurality of servers in association with an identifier of the digital content; means for receiving, from an operator, input of information regarding the network address of the digital content accessed by a client and the time when the digital content was accessed; means for specifying the network address of the digital content based on the information regarding the network address; means for specifying the identifier of the digital content using the publishing period of the digital content based on the specified network address and the accessed time; and means for providing at least one response template associated with the identifier of the digital content.

The response template is a past response regarding the digital content or one created based on the past response. The system includes means for transmitting the response created based on the response template to the client, and means for storing the transmitted response in a database.

While the present invention is directed to a system for supporting responding to an inquiry from a client regarding the digital content published on a plurality of servers on a network, the present invention may also be understood as a method, program or program product for supporting responding to the inquiry. The program product may include a storage medium having the above-described program stored therein, for example, or may include a medium for transmitting the program.

FIG. 1 is a high-level conceptual diagram of a network system 100 according to an embodiment of the present invention. The network system 100 according to the embodiment of the present invention includes an enterprise system 105, a client computer 110, and web servers 120a and 120b (hereinafter, they may be collectively referred to as "web server 120").

In the network system 100 according to the embodiment of the present invention, the enterprise system 105, the client computer 110 and the web server 120 can communicate with each other through a network 195. As an example, the network 195 can be implemented as the well-known Internet. The Internet uses TCP/IP to connect between the computers.

In the embodiment of the present invention, the enterprise possessing the enterprise system 105 can upload a digital content such as the information regarding its own products (for example, specification of the products, sales campaign, recall notification and others) to the web server 120 through the Internet 195, for publishing it to the customers or potential customers 115 (hereinafter, simply referred to as "customer 115"). It is noted that, in the embodiment of the present invention, the enterprise is capable of publishing the digital content on a plurality of web servers for different periods of time.

In the embodiment of the present invention, the web server 120 can publish the digital content received from the enterprise system 105 on the World Wide Web in association with a specific network address. It is assumed in the embodiment of the present invention that the network address conforms to the URL (Uniform Resource Locator) specification as defined in the recommendation W3C. The web server 120, in response to reception of a request from the client computer 110 for a digital content including a specific network address, transmits the digital content to the client computer 110.

In the embodiment of the present invention, the client computer 110 operated by a customer 115 can access the web server 120 through the Internet 195 to obtain the uploaded digital content. Further, the customer 115 can transmit an electronic mail including an inquiry regarding the accessed digital content, from the client computer 110 to the enterprise system 105 over the Internet 195. The customer 115 can also make an inquiry to the enterprise over a telephone line 190.

The enterprise system 105 of the embodiment of the present invention will now be described in more detail. The enterprise system 105 of the embodiment of the present invention includes a content creation terminal 180 used by a content creator 185 for creating a digital content to be published on the web server 120, and a content management server 160 for management of the created digital content.

The enterprise system 105 of the embodiment of the present invention further includes operator terminals 130a to 130c (hereinafter, they may be collectively referred to as "operator terminal 130") operated by operators 135a to 135c (hereinafter, they may be collectively referred to as "operator 135") who respond to the inquiries regarding the digital content uploaded to the web server 120, and an operator support server 140 for supporting the operators to respond to the inquiries.

The computers in the enterprise system 105 are connected with each other through an internal LAN 170 and capable of communicating by TCP/IP. Further, the enterprise system 105 is connected to the Internet 195 via a firewall 150.

Figure 2:
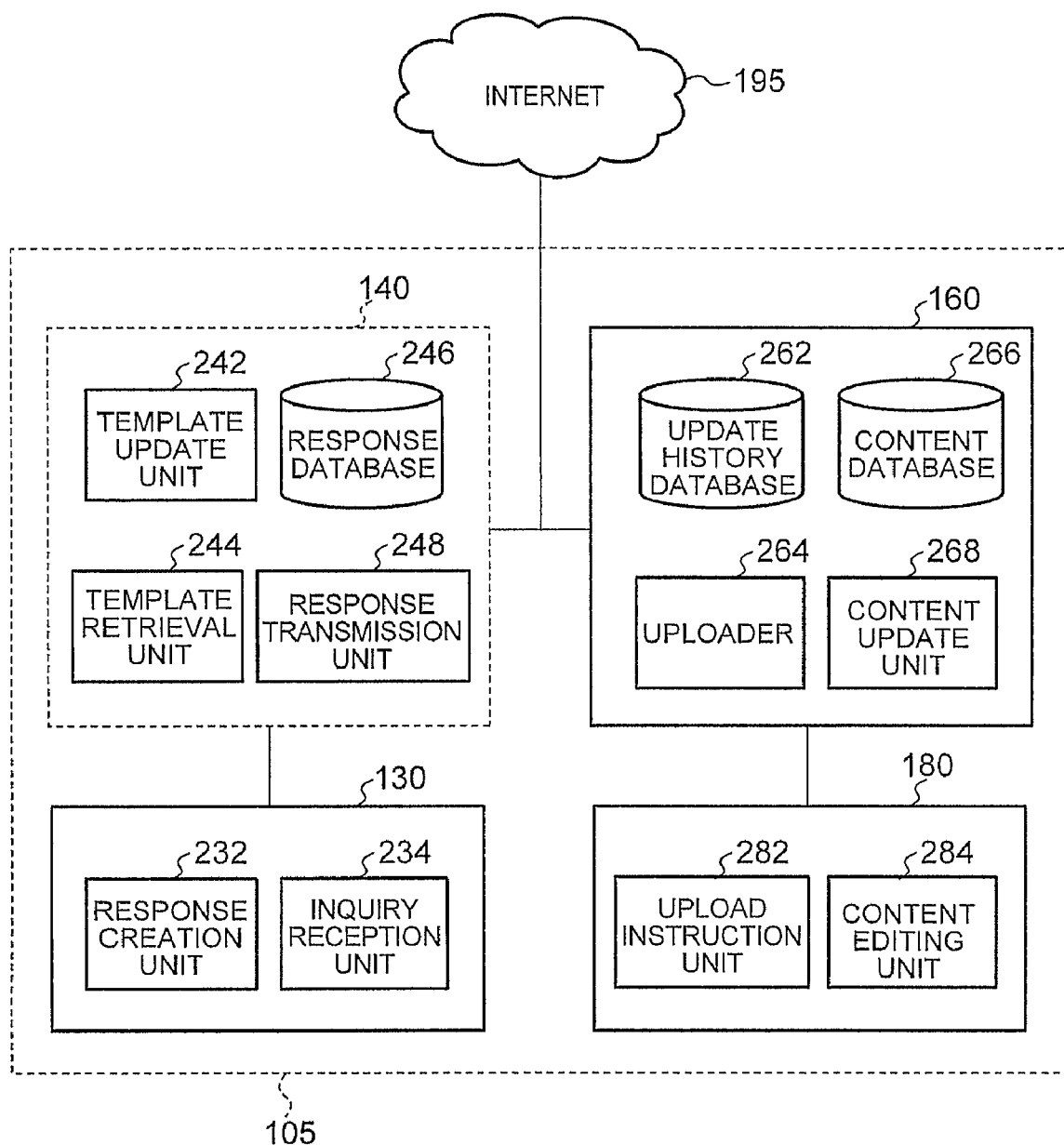
FIG. 2 is a functional block diagram of an enterprise system 105 of the embodiment of the present invention.

FIG. 2 is a functional block diagram of the enterprise system 105 of the embodiment of the present invention. Each element shown in the functional block diagram of FIG. 2 can be implemented in an information processing apparatus having a hardware configuration as shown by way of example in FIG. 8, by loading an operating system and a computer program stored in a hard disk drive 13 or the like to a main memory 4 so as to be read by a CPU 1 and by making the hardware resources and the software cooperate together.

The enterprise system 105 includes an operator terminal 130, an operator support server 140, a content management server 160, and a content creation terminal 180. The content creation terminal 180 includes an upload instruction unit 282 and a content editing unit 284. The content editing unit 284 provides the function of creating and editing a digital content to be published on the web server 120 through the Internet 195, in accordance with the operation of the content creator 185. The upload instruction unit 282 has the function of causing an uploader 264 to upload the digital content created by the content creator 185 using the content editing unit 284 and recorded on a content database 266. It is noted that the firewall 150 is not illustrated in FIG. 2 for the sake of simplification of explanation.

The content management server 160 includes an update history database 262, an uploader 264, a content database 266, and a content update unit 268. The content update unit 268 assigns an identifier (hereinafter, referred to as "content ID") to the digital content newly created or updated by the content creator 185 using the content editing unit 284, and stores the digital content in the content database 266 in association with the assigned content ID. It is assumed that, in the embodiment of the present invention, the assigned content ID is unique over the entire system. The content database 266 records the digital content published on the web server 120 in association with the content ID assigned by the content update unit 268.

The uploader 264 uploads the digital content recorded on the content database 266 to a prescribed web server 120 in accordance with an instruction from the upload instruction unit 282. Further, the uploader 264 records the URL indicating where the content was published and the publishing started time in the update history database 262, in association with the content ID of the uploaded digital content. The uploader 264 can also delete the digital content published on the web server 120. For the deleted web content, the uploader 264 records the publishing stopped time in the update history database 262.

Namely, in the upload history database 262, at least the content ID, the URL in the web server where the content is published, the publishing started time, and the publishing stopped time are recorded for the uploaded digital content. An example of the contents of the update history database 262 of the embodiment of the present invention is shown in FIG. 5.

The operator terminal 130 includes a response creation unit 232 and an inquiry reception unit 234. The inquiry reception unit 234 receives an inquiry regarding the content from the client computer 110 in the form of an electronic mail, for example, and presents the same to the operator. In the embodiment of the present invention, the operator 135 may also receive such information through the telephone line 190.

The response creation unit 232 provides the function for the operator 135 to create a response to the inquiry regarding the digital content. It is assumed in the embodiment of the present invention that the operator creates the response in the form of an electronic mail. The response creation unit 232 also has the function of providing a response template that is obtained by receiving input of the information regarding the network address of the digital content accessed by the customer, the information regarding the accessed time, and the narrowing keyword(s) pertaining to the digital content, and by transmitting them to a template retrieval unit 244. A keyword is a phrase consisting of a plurality of words or is a single word.

The operator support server 140 includes a template update unit 242, a template retrieval unit 244, a response database 246, and a response transmission unit 248. The response transmission unit 248 receives and transmits the response created in the response creation unit 232 to the customer, and also stores the content of the response in the response database 246 as a future response template. More specifically, the response transmission unit 248 records the content ID of the target of the inquiry, the time when the inquiry was made, the content of the inquiry, and the content of the response onto the response database 246, in association with a response template ID. An example of the contents of the response database 246 in the embodiment of the present invention is shown in FIG. 6.

The template update unit 242 is capable of processing the response template stored in the response database 246 according to an instruction from the operator 135. The operator 135 can further elaborate or generalize the response template, or associate the content of the response with another digital content. The template retrieval unit 244 is capable of retrieving the response template(s) stored in the response database 246 based on the information regarding the network address of the digital content accessed by the customer, the information regarding the accessed time and the narrowing keyword(s) that were received from the response creation unit 232, and returning the retrieved response template(s) to the response creation unit 232.

Figure 3:
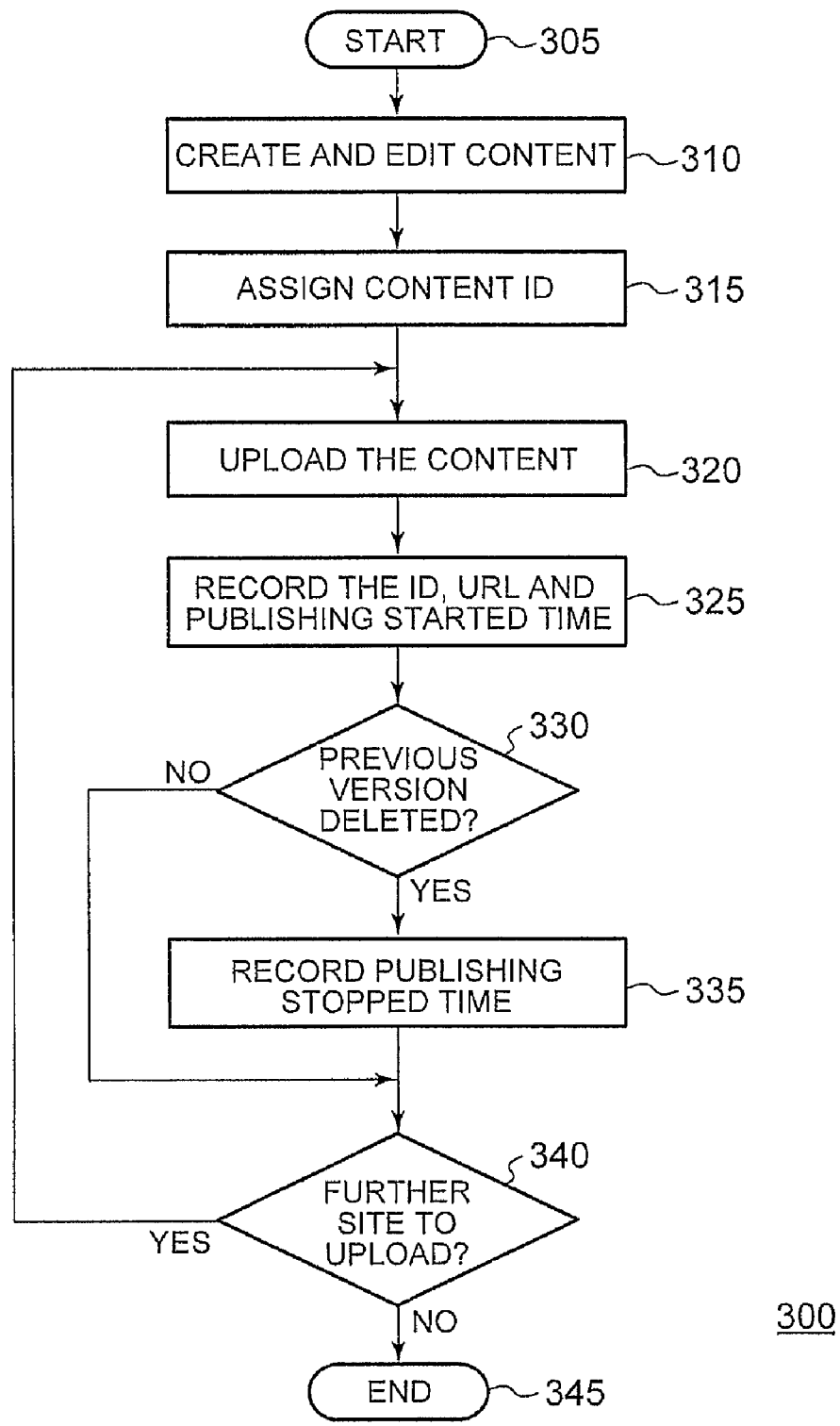
FIG. 3 is a flowchart reproviding creation and upload of a digital content of a network system in the embodiment of the present invention.

FIG. 3 is a flowchart 300 reproviding creation and upload of the digital content in the network system 100 of the embodiment of the present invention. The process starts at the step 305. Firstly, the content creator 185 operates the content creation terminal 180 to create a digital content to be uploaded to the web server 120 (step 310). Further, the content created in the step 310 is stored in the content database 266, and a content ID is assigned to the digital content (step 315).

The uploader 264 uploads the digital content recorded on the content database 266 to the web server 120 in accordance with an instruction from the upload instruction unit 282 (step 320). Next, in response to completion of the upload, the uploader 264 records the content ID, the URL indicating where the content was uploaded, and the publishing started time (that is, the time when the upload has been completed) onto the update history database 262 (step 325).

As the process further proceeds, it is determined whether the previous version of the digital content has been updated and the data of the previous version has been deleted (step 330). If it is determined in the step 330 that the data of the previous version has been deleted, the process proceeds from the step 330 along the YES arrow to the step 335, where the time when the data of the previous version was deleted is recorded onto the update history database 262 as the publishing stopped time, and then the process proceeds to the step 340.

If it is determined in the step 330 that the data of the previous version has not been deleted because there is no such data, the process proceeds directly from the step 330 to the step 340 along the NO arrow.

It is further determined whether there is another web site to which the digital content needs to be uploaded (step 340). If it is determined in the step 340 that there is another web site for which upload is necessary, the process returns from the step 340 to the step 320 along the YES arrow, and the steps 320 through 335 are repeated. It is noted that, during the repetition, the ID of the content, the publishing started time, and the publishing stopped time are recorded for each URL. If it is determined in the step 340 that there is no other web server for which upload is necessary, the process proceeds from the step 340 along the NO arrow to the step 345, where the process is terminated.

Figure 4:
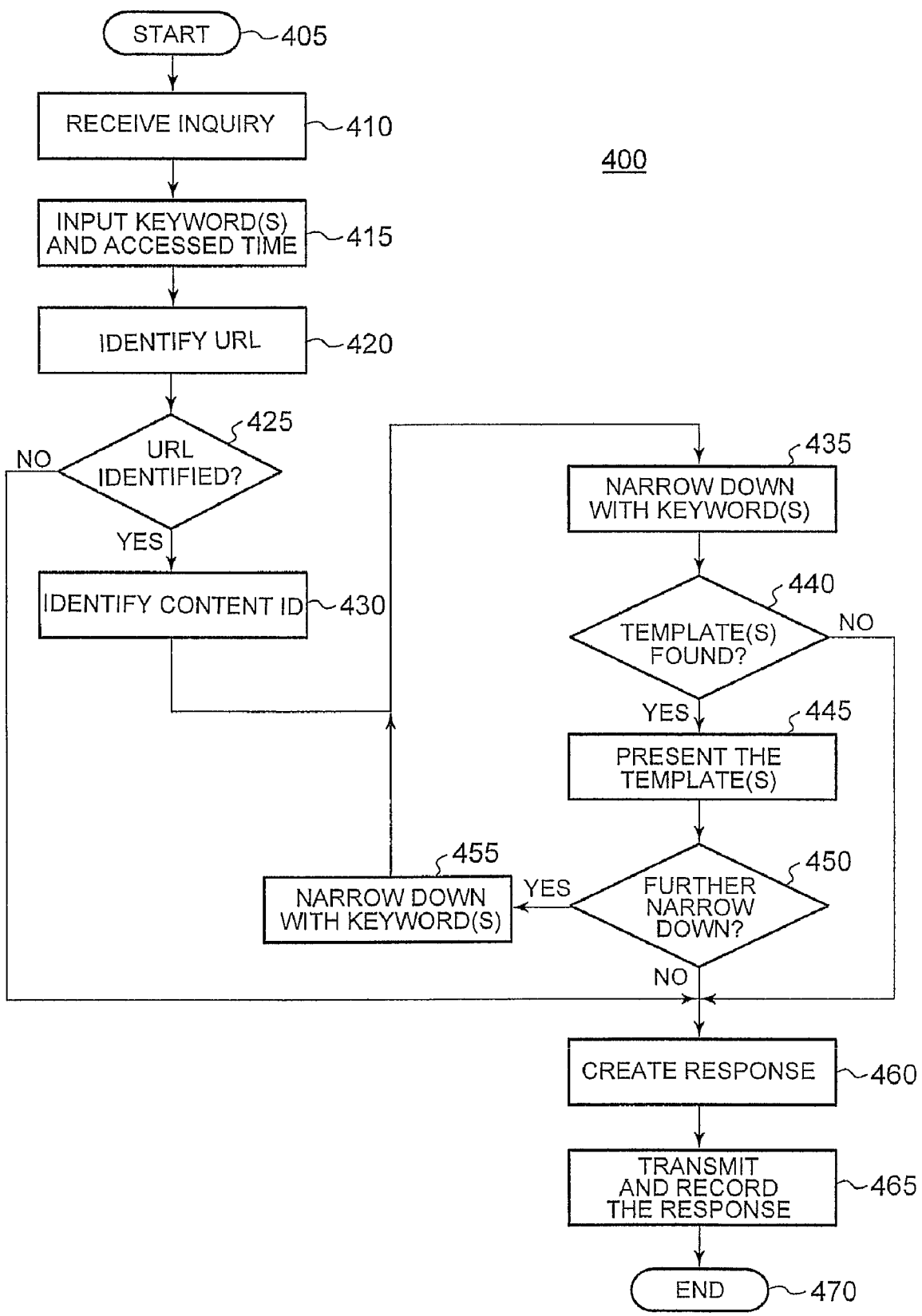
FIG. 4 is a flowchart reproviding an operation of the system in the case of responding to an inquiry from a customer who accessed the uploaded digital content in the embodiment of the present invention.

FIG. 4 is a flowchart 400 describing an operation of the system in the case of responding to an inquiry from the customer who has accessed the uploaded digital content in the embodiment of the present invention. The process starts at the step 405. Firstly, the operator receives an inquiry from the customer in the inquiry reception unit 234 (step 410). It is noted that the inquiry from the customer in the embodiment of the present invention includes the information regarding the URL of the content accessed by the customer and the information regarding the accessed time, such as the following: "I saw an advertisement for the sales campaign of the personal computer products of your company (ABC Co., Ltd.) on the web site of XYZ sales agency on Jun. 10, 2006. Please let me know about the specifications of the personal computer products listed on the campaign".

The operator 135 inputs the information regarding the URL of the digital content accessed by the customer 115, the accessed time and the narrowing keyword(s) using the response creation unit 232 (step 415). In the embodiment of the present invention, for the information regarding the URL, the operator may input the keywords extracted from the information received by the operator from the customer, which he/she thinks useful for specifying the URL, such as "XYZ sales agency", "personal computer product", "sales campaign" and "advertisement". For the accessed time, the operator may input the information, such as "Jun. 10, 2006", extracted from the information received by the operator from the customer. As the narrowing keyword(s), the operator may input the keyword(s), such as "product specification", extracted from the information received by the operator from the customer.

As the process proceeds, the URL of the digital content accessed by the customer is identified based on the information regarding the URL of the digital content accessed by the customer 115 (step 420). It is assumed in the embodiment of the present invention that the following URL: "http://www.xyz_shop.com/abc_products/campaign.html" has been identified from the information of "XYZ sales agency", "personal computer product", "sales campaign", and "advertisement" (see the example of content records in the update history database 262 in FIG. 5).

Next, it is determined whether the URL of the digital content accessed by the customer has been identified in the step 420 (step 425). If it is not determined in the step 425 that the URL has been identified, the process proceeds directly from the step 425 to the step 460 along the NO arrow. In this case, the operator is supposed to create a response from the beginning, without using any response template.

If it is determined in the step 425 that the URL has been identified, the process proceeds from the step 425 along the YES arrow to the step 430, where the content ID is identified, using the update history database 262, based on the identified URL and the accessed time (step 430). It is assumed in the embodiment of the present invention that the content ID of "0003" has been identified from the URL of "http://www.xyz_shop.com/abc_products/campaign.html" and the accessed time of "Jun. 10, 2006" (see the example of content records in the update history database 262 in FIG. 5).

As the process further proceeds, the response templates for the inquiries regarding the content having the relevant content ID are extracted from the response database (step 435). In the case where at least one narrowing keyword has been input in the step 415, only the response template(s) narrowed down by using the narrowing keyword(s) is/are extracted in the step 435. It is assumed in the embodiment of the present invention that the response template having the template ID of "0002" has been extracted based on the keyword of "product specification" (see the example of response records in the response database 246 in FIG. 6).

Next, it is determined whether a response template has been extracted in the step 435 (step 440). If it is determined in the step 440 that the response template was not extracted, the process proceeds directly from the step 440 to the step 460 along the NO arrow, in which case the operator 135 is supposed to create a response from the beginning, without using any response template.

If it is determined in the step 440 that the response template (s) has/have been extracted, the process proceeds from the step 440 along the YES arrow to the step 445. In the step 445, a list of the extracted response templates and the summaries of the templates are provided to the operator 135.

Next, the operator 135 chooses whether to further narrow down the provided list (step 450). If the operator chooses to further narrow down the list in the step 450, the process proceeds from the step 450 along the YES arrow to the step 455, where additional narrowing keyword(s) is/are received. The steps 435 through 445 are then repeated. If the operator does not choose to further narrow down the list in the step 450, the process proceeds from the step 450 to the step 460 along the NO arrow. In this case, the operator selects a template reusable for the current response from the provided list, and creates a response using the template (step 460).

When the creation of the response in the step 460 is finished, the response transmission unit 248 transmits the response to the customer 115, and also records the content of the response onto the response database 246 for use as a response template in the future (step 465). The process terminates at the step 470.

Figure 7:
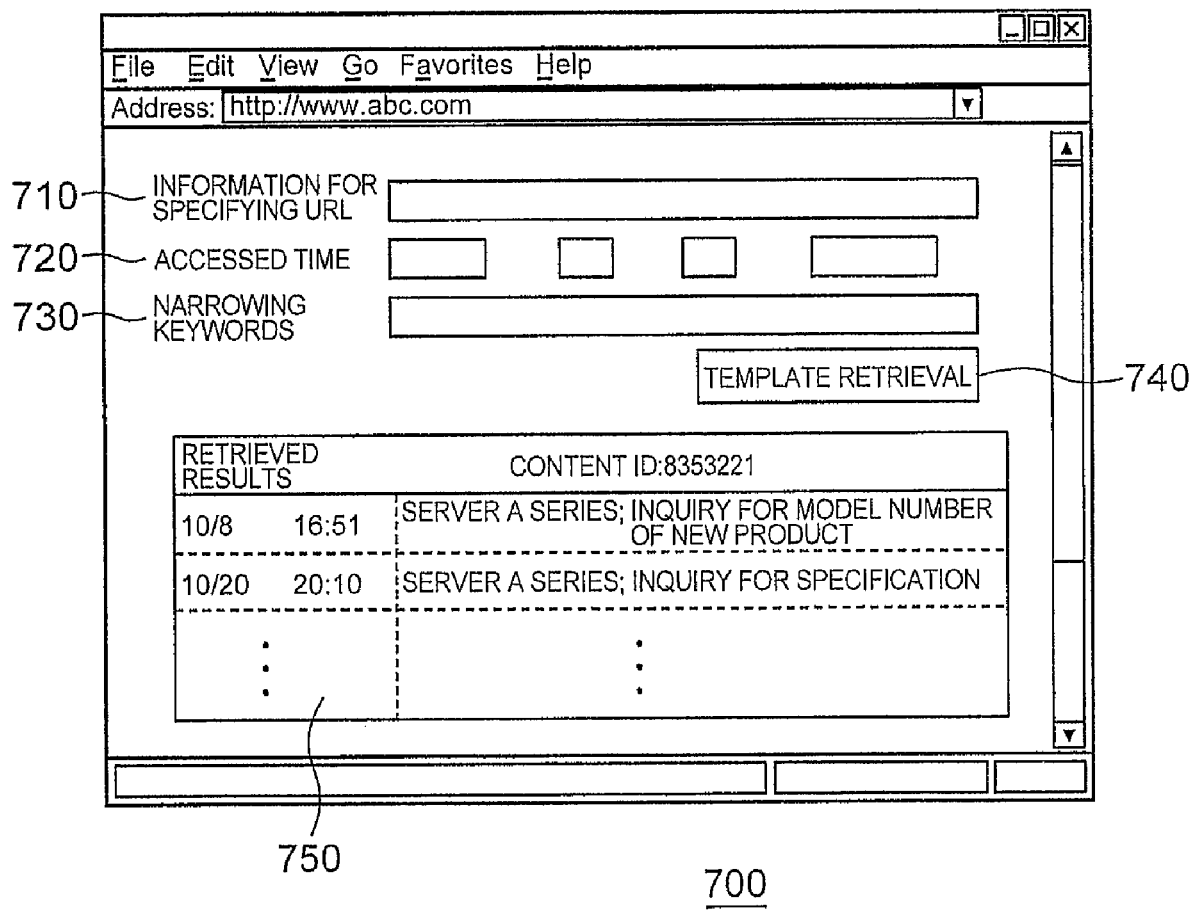
FIG. 7 is a scene of a graphical user interface displayed on an operator terminal in the embodiment of the present invention.

FIG. 7 shows an example of a graphical user interface 700 that is displayed on the operator terminal 130 used by the operator 135 during the process of the flowchart 400 in FIG. 4 according to the embodiment of the present invention.

In the embodiment of the present invention, it is configured such that a list 750 of the extracted response templates is displayed when the operator 135 inputs the information regarding the URL, the information regarding the accessed time and the narrowing keyword(s) in the input fields 710, 720 and 730, respectively, and clicks on a template retrieval button 740. When the response template to be used is selected from the list by double click or the like, a popup window is generated for creation of an electronic mail having the response template inserted in the text. A person skilled in the art can design such a graphical user interface as appropriate, so that any further description thereof will not be provided here.

Figure 8:
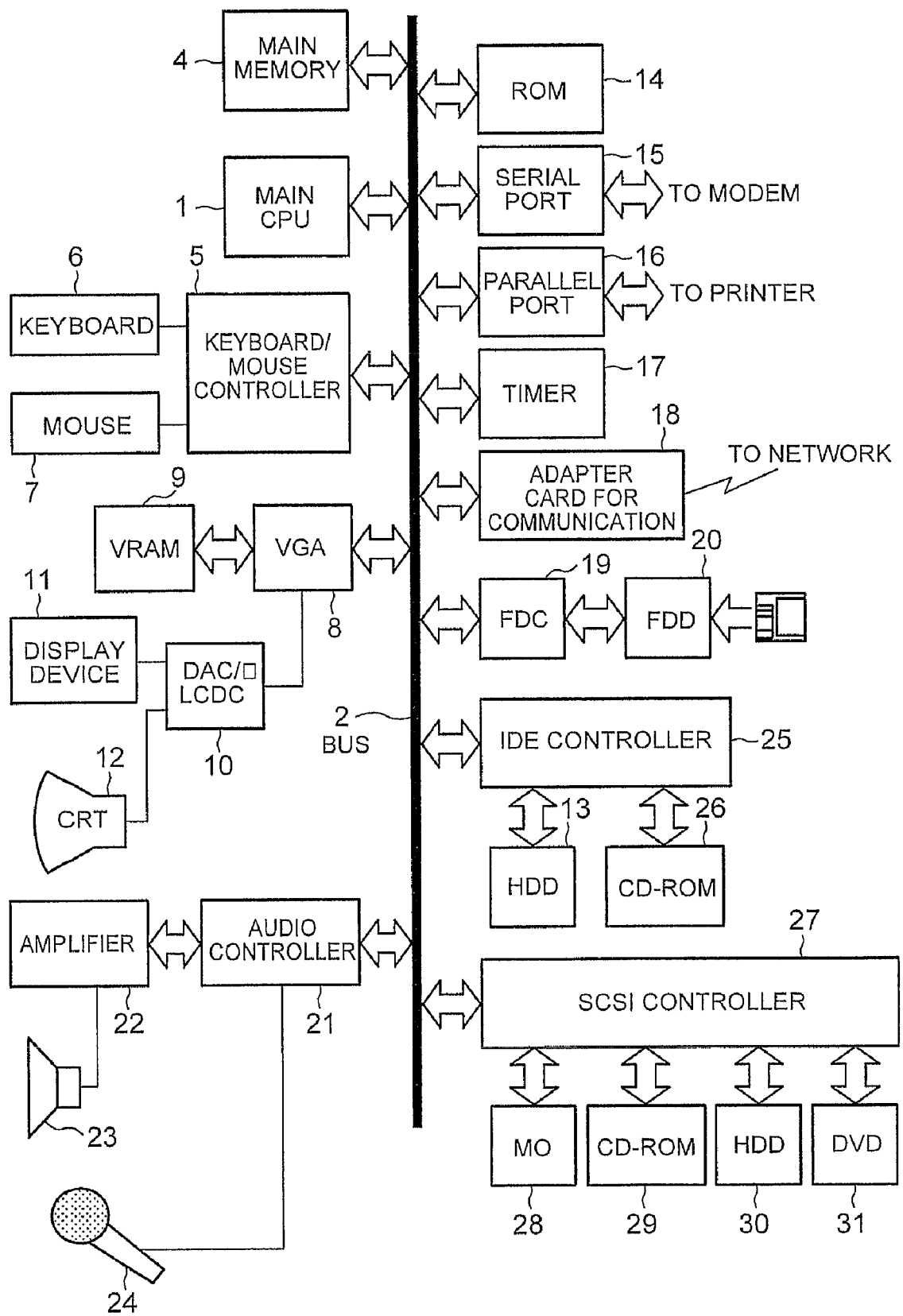
FIG. 8 illustrates an example of hardware configuration of an information processing apparatus suitable for implementing an operator support server or the like in the embodiment of the present invention.

FIG. 8 shows an example of hardware configuration of an information processing apparatus suitable for implementing the operator support server, firewall, content management server, operator terminal, content creation terminal, client computer, web server and others according to the embodiment of the present invention. The information processing apparatus includes a CPU (Central Processing Unit) 1 and a main memory 4 connected to a bus 2. Hard disk drives 13, 30, and removable storages (external storage systems with exchangeable recording media) such as CD-ROM drives 26, 29, flexible disk drive 20, MO drive 28, and DVD drive 31 are connected to the bus 2 via a flexible disk controller 19, IDE controller 25, SCSI controller 27 and others.

The recording media such as the flexible disk, MO, CD-ROM, and DVD-ROM are inserted into the removable storages. A computer program product may comprise any of the preceding recording media, the hard disk drives 13, 30, a ROM 14, etc. having the codes of the computer program recorded thereon for giving instructions to the CPU and others in cooperation with the operating system to implement the present invention. The computer program is executed as it is loaded to the main memory 4. The computer program may be compressed or may be recorded on a plurality of media by dividing it into a plurality of pieces.

The information processing apparatus receives input from input devices such as a keyboard 6 and a mouse 7 via a keyboard/mouse controller 5. The information processing apparatus is connected to a display device 11 for providing visual data to the user via a DAC/LCDC 10.

The information processing apparatus is connected to a network via a network adapter 18 (Ethernet (R) card or token ring card) to allow for communication with other computers. Although not shown, it may also be connected to a printer via a parallel port, or to a modem via a serial port.

It will readily be understood from the above description that the information processing apparatus suitable for implementing the data processing system 100 according to the embodiment of the present invention can be implemented by the information processing apparatus such as an ordinary personal computer, work station, main frame and the like, or by any combination thereof. The constituent elements are only illustrative, and all of the elements are not necessarily indispensable for the present invention.

Various modifications, including implementation of the hardware constituent elements of the information processing apparatus used in the embodiment of the present invention by combining a plurality of machines and distributing the functions to the machines, will readily be conceivable for a person skilled in the art. Such modifications are naturally encompassed within the idea of the present invention.

For the operator support server and others, it is possible to adapt an operating system supporting the GUI (Graphical User Interface) multi-window environment, such as the Windows (R) operating system provided by Microsoft Corporation, the MacOS (R) provided by Apple Computer Incorporated, or the UNIX (R) based system provided with the X Window System (for example, AIX (R) provided by International Business Machines Corporation).

It can be understood from the foregoing that the operator support server used in the embodiment of the present invention is not restricted to a specific multi-window operating system environment.

Further, the present invention can be implemented as hardware, software, or a combination of the hardware and software. As a typical example of implementing the present invention by the combination of the hardware and software, it may be implemented with a data processing system having a prescribed program. In this case, when the prescribed program is loaded to and executed by the data processing system, the program controls the data processing system to let it execute the processing according to the present invention. The program is composed of an instruction set that can be expressed by an arbitrary language, code, or notation. The instruction set allows the system to perform a particular function, directly or after either or both of the following: 1) conversion to another language, code, or notation; and 2) reproduction in another medium.

It is needless to say that not only the program itself but also the medium having the program recorded thereon is within the scope of the present invention. The program for execution of the functions of the present invention can be stored in any computer readable recording medium such as a flexible disk, MO, CD-ROM, DVD, hard disk drive, ROM, MRAM, and RAM. In order for the storage to the recording medium, the program may be downloaded from another data processing system connected via a communication line or may be reproduced from another recording medium. Further, the program may be stored in one recording medium or a plurality of recording media by compressing or dividing it into a plurality of pieces. Furthermore, it is of course possible to provide the program product for implementing the present invention in various forms.

It will be apparent for a person skilled in the art that various modifications or improvements are possible for the embodiment described above. Thus, such modified or improved embodiments are naturally included in the technical scope of the present invention.

As described above, according to the embodiment of the present invention, it is possible to allow the operator to reuse the past responses more efficiently when responding to an inquiry regarding the digital content published on a plurality of servers on a network. Therefore, it can readily be understood that it is possible to enhance the productivity in the case, for example, that an operator in a contact center responds to an inquiry received from a customer about the web content published on a plurality of sites.

What is claimed is:

1. A method for supporting responding to an inquiry regarding a digital content published on a plurality of servers on a network, comprising:
   a step of recording an identifier of the digital content in association with a network address and a published period of the digital content in each of the plurality of servers, and
   where the identifier of the digital content can be associated with a plurality of network addresses associated with the plurality of servers, respectively;
   a step of receiving inputs of information regarding the network address of the digital content browsed by a client and a time to browse the digital content;
   a step of identifying the network address of the digital content browsed by the client from the network address recorded in a database, based upon the information regarding the network address of the digital content browsed by the client;
   a step of identifying the identifier of the digital content browsed by the client based upon the network address and browsing time of the digital content browsed by a specified client, using the database where the network address and the published period of the digital content in each of the plurality of servers in association with the identifier of the digital content; and
   a step of presenting one or more response templates in association with the identifier of the digital content browsed by the client by accessing to a response database for managing one or more response templates in association with the identifier of the digital content.

* * * * *